United States Patent [19]
Cox

[11] Patent Number: 5,949,864
[45] Date of Patent: Sep. 7, 1999

[54] FRAUD PREVENTION APPARATUS AND METHOD FOR PERFORMING POLICING FUNCTIONS FOR TELEPHONE SERVICES

[76] Inventor: Neil B. Cox, 6158 Elgin Avenue, Burnaby, British Columbia, Canada, V5H 3S4

[21] Appl. No.: 08/848,431

[22] Filed: May 8, 1997

[51] Int. Cl.⁶ .............................. H04M 1/66; H04M 3/42
[52] U.S. Cl. ........................ 379/189; 379/196; 379/201; 379/220; 379/243; 379/386
[58] Field of Search .................................. 379/188, 189, 379/196, 197, 198, 199, 200, 219, 220, 221, 242, 243, 283, 377, 386; 370/230, 231, 232, 235

[56] References Cited

U.S. PATENT DOCUMENTS

| | | | |
|---|---|---|---|
| 4,720,862 | 1/1988 | Nakata et al. ............................. | 381/38 |
| 4,809,272 | 2/1989 | Torgrim et al. ...................... | 370/110.3 |
| 4,811,378 | 3/1989 | Else et al. ................................. | 379/189 |
| 4,815,136 | 3/1989 | Benvenuto et al. ....................... | 381/43 |
| 4,815,137 | 3/1989 | Benvenuto et al. ....................... | 381/43 |
| 4,979,118 | 12/1990 | Kheradpir ............................. | 379/220 |
| 5,253,247 | 10/1993 | Hirose et al. ............................. | 370/232 |
| 5,353,346 | 10/1994 | Cox et al. ................................. | 379/386 |
| 5,392,344 | 2/1995 | Ash et al. ................................. | 379/221 |
| 5,442,696 | 8/1995 | Lindberg et al. ........................ | 379/386 |
| 5,504,810 | 4/1996 | McNair .................................... | 379/189 |
| 5,535,271 | 7/1996 | Jangi et al. ............................... | 379/351 |
| 5,539,804 | 7/1996 | Hong et al. ............................... | 379/33 |
| 5,606,604 | 2/1997 | Rosenblatt et al. ....................... | 379/198 |
| 5,627,886 | 5/1997 | Bowman ................................... | 379/189 |
| 5,768,354 | 6/1998 | Lange et al. ............................. | 379/189 |
| 5,784,437 | 7/1998 | Martinez et al. ........................ | 379/201 |
| 5,790,645 | 8/1998 | Fawcett et al. .......................... | 379/189 |
| 5,818,916 | 10/1998 | Vogl et al. ............................... | 379/189 |

OTHER PUBLICATIONS

Law, Randall A. et al., "Real–Time Multi–Channel Monitoring Of Communications On A T1 Span", Proceedings of the May 9–10, 1991 IEEE Pacific Rim Conference on Communications, Computers and Signal Processing, pp. 306–309.

Primary Examiner—Scott Wolinsky

[57] ABSTRACT

An apparatus and method is disclosed for performing policing functions for specialized telephone services, and for mitigating fraudulent usage of such services in ubiquitous telephone networks that carry voice, facsimile or voice-band-data traffic. Signal processing is used to determine the properties of traffic present on a channel at a given point in time, and actions are conditionally imposed based on such traffic properties. A first embodiment of the invention can be applied to prevent fraudulent use of telephone services through suppression of an answer supervision response. A second embodiment of the invention can also be applied for regulation of access to specialized telephone services which depend on the manner of customers' use of such services.

32 Claims, 4 Drawing Sheets

| Name | SUMMARY OF NETWORK-GENERATED SIGNALS | | | | |
|---|---|---|---|---|---|
| SS4: ITU Q.122 | 2040 HZ, 2400 HZ OR BOTH, F ± 6 HZ, >30 MS DURATION, >30 MS SPACING | | | | |
| SS5: ITU Q.141 | 2400 HZ, 2600 HZ OR BOTH, F ± 15 HZ, >30 MS DURATION, >30 MS SPACING | | | | |
| AUDIBLE TONES: BELLCORE TR-NWT-000506, ITU Q.35 | | | | | |
| DIAL TONE | 340-425 HZ + 400-450 HZ, DIFF>25 HZ, OR SINGLE TONE 400-450 HZ STEADY ON, OR 0.1 SEC ON, 0.1 SEC OFF THREE TIMES, OR BOTH | | | | |
| CALL INTERRUPT | 440 HZ, 2 SEC BURST | | | | |
| CALL WAITING | 400-450 HZ, 0.3-0.5 SEC ON, 8-10 SEC SPACING OR TWO OR THREE REPETITIONS OF 0.1-0.2 SEC ON, 0.1-0.2 SEC OFF | | | | |
| HIGH TONE | 480 HZ, 0.5 SEC ON, OR STEADY ON | | | | |
| ZIP TONE | 480 HZ, 0.1 SEC ON, 0.1 SEC OFF, 0.1 SEC ON, OR ONE BURST OF 0.75-1 SEC | | | | |
| RINGING | 340-500 HZ POSSIBLY MODULATED @ 16-100 HZ, 0.67-2.5 SEC ON, 3-5 SEC OFF, REPEATING | | | | |
| BUSY TONE | 340-500 HZ (425 PREFERRED), EQUAL ON/OFF, 0.3-1.1 SEC CYCLE TIME | | | | |
| LOW TONE | 480 HZ + 620 HZ, 0.25-.5 SEC ON, SAME TIME OFF, REPEATING, OR 0.5-1 SEC ONCE | | | | |
| SPECIAL INFO TONE | 950 HZ, 1400 HZ, 1800 HZ IN SUCCESSION, EACH 330±70 MS WITH <30 MS GAP, F±50 HZ | | | | |
| RECORDING WARNING | 1400 HZ±1.5% for 350-500 MS | | | | |
| PAYPHONE RECOGNITION | F1=1100-1750, F2=750-1450, F1/F2=1.2-1.5, F1 ON 200 MS OFF 200 MS, F2 ON 200 MS OFF 2 SEC | | | | |
| COIN DEPOSIT TONES | DUAL-TONE 1700+2200 ± 3.5%, ± 5dB TWIST, >-25dBM0, 20-700 MS, >20 MS SPACING | | | | |
| RX OFF HOOK (HOWLER) | 1400 HZ + 2060 HZ + 2450 HZ + 2600M HZ, 0.1 SEC ON, 0.1 SEC OFF, REPEATING. | | | | |
| DTMF: ITU Q.23, Q.24: >40 MS DURATION, >30 MS SPACING, F ± 2%, +6 dB TO -10 dB TWIST (ON UNI BUT NOT NNI) | | | | | |
|  | 1209 HZ | 1336 HZ | 1477 HZ | 1633 HZ | |
| 697 HZ | 1 | 2 | 3 | A | |
| 770 HZ | 4 | 5 | 6 | B | |
| 852 HZ | 7 | 8 | 9 | C | |
| 941 HZ | * | 0 | # | D | |
| MF: ITU Q.153, Q322: >55 MS DURATION, >55 MS SPACING, F ± 1.5%, ± 6 dB TWIST | | | | | |
|  | 900 HZ | 1100 HZ | 1300 HZ | 1500 HZ | 1700 HZ |
| 700 HZ | 1 | 2 | 4 | 7 | CODE 11 |
| 900 HZ |  | 3 | 5 | 8 | CODE 12 |
| 1100 HZ |  |  | 6 | 9 | KP |
| 1300 HZ |  |  |  | 0 | KP2 |
| 1500 HZ |  |  |  |  | ST |

FRAUD PREVENTION APPARATUS AND METHOD FOR PERFORMING POLICING FUNCTIONS FOR TELEPHONE SERVICES

BACKGROUND

This invention is intended for use in traditional telephone networks that carry voice, facsimile or voice-band-data (VBD) traffic. The term "facsimile" represents Group 3 facsimile, which is a ubiquitous international standard for communicating facsimiles of documents over telephone networks. The term "voice-band-data" represents machine-generated information transported over a standard telecommunications voice channel. While facsimile is a form of voice-band-data, it is mentioned separately in this document to highlight the fact that it may be separately classified in the invention.

There is a need for telecommunications service providers to perform policing functions for prevention of fraudulent use of telephone services. As noted by Else and Frantzen in U.S. Pat. No. 4,811,378, fraud prevention is an ongoing challenge for telecommunications service providers: an industry has flourished to develop methods and devices for evasion of billing. Many such devices rely on the fact that most of today's telecommunications switches open a communications channel as soon as a call is placed, even though billing does not start until the network establishes that the call has been answered. As a consequence, the answering party can evade billing by using a device that withholds the answer supervision response, which is the signal that indicates that the call has been answered.

Customers with 1-800 numbers have a strong motivation to evade billing through suppression of the answer supervision response because they both answer the call and receive the bill. Such customers usually have the means to evade billing as well, as they generally operate telephone switching equipment called private-branch exchanges (PBXs) which can be configured to suppress the answer supervision response.

Suitable approaches for control of answer supervision fraud are as follows:

1. Switches in the telephone network could be upgraded in accordance with U.S. Pat. No. 4,811,378 such that an open talk channel is only provided after the answer supervision response is observed. Such an upgrade is extremely expensive and time-consuming. Furthermore, one has the technical challenge of ensuring that customers hear each other soon as the call is answered, which is the reason that most switches were designed to provide an open talk channel during call setup.
2. A device such as is described in U.S. Pat. No. 4,811,378 could be inserted into the network so as to block one side of the communications channel until the answer supervision response is observed. Such a device interferes in the normal functioning of the network for all calls, only a small minority of which are fraudulent. Means must be incorporated into the network to promptly disable the device when the call is answered, and to override the device when required for network maintenance and administration. Furthermore, such a device will block service usage by honest customers when the answer supervision response is missed because of equipment failure within the network.
3. Intervention could be imposed when a call remains unanswered for an inordinate period of time. The intervention may be to terminate the call or to insert the missing answer supervision response. Unfortunately, the time-out period for this approach needs to be quite long because honest customers may wait a significant period of time for a call to be answered. Also, failure to produce an answer supervision response can be due to faults in the network equipment, and it is not desirable to disturb honest customers when such is the case.

There is a need for telecommunications service providers to regulate access to specialized telephone services which depend on the manner of customers' use. Such a function is performed by a predecessor to the present invention, herein called the FaxCom device[1]. The FaxCom device was deployed across Canada in 1990 to support a reduced-rate facsimile-and-data-only service called FaxCom. It has also been demonstrated and sold to various international clients since 1990, and it has been offered as a vehicle for implementing class-based billing, where customers are billed differently based on whether their calls are voice, facsimile or voice-band-data. A general description of the FaxCom device was published in an article by Randall A. Law, Terrence W. Holm and Neil B. Cox entitled "Real-Time Multi-Channel Monitoring of Communications on a T1 Span", published in the Proceedings of the 1991 IEEE Pacific Rim Conference on Communications, Computers and Signal Processing at pages 306 to 309.

The FaxCom device determines whether Voice, Facsimile or VBD are present on designated telephone calls, and imposes a voice message and terminates the call when voice is observed. The FaxCom device only applies policing when both sides of the channel are off-hook, which precludes its use in policing of call setup processes for control of answer supervision fraud. The FaxCom device does not separately classify handshaking signals or audible network signaling, and as a consequence it is unnecessarily slow in detecting Facsimile and VBD. Finally, the FaxCom device is not suitable when the direction of traffic flow is important, as it is not able determine which end of the communications channel is generating traffic.

Other patents include components for classifying telephone signals, such as U.S. Pat. No. 5,539,804, U.S. Pat. No. 4,809,272, U.S. Pat. No. 4,815,137, U.S. Pat. No. 4,815,136 and U.S. Pat. No. 4,720,862. However, none of these other inventions is comprised of a comparable combination of signal classification and source classification for policing of specialized telephone services.

Therefore, there is a need for a system and method to actively determine the properties of customer usage of telephone services, and to promptly implement prescribed actions based on the observed properties. This enables telecommunications service providers to perform policing functions for prevention of fraudulent use of telephone services. This also provides a means for regulating access to specialized telephone services which depend on the manner of customers' use.

SUMMARY OF THE INVENTION

An object of the present invention is to allow telecommunications service providers to apply policing functions for telephone services on ubiquitous telephone networks that carry voice, facsimile and data traffic. According to the invention there is a channel state detector, a traffic classifier, a source classifier and a regulator device which combine to conditionally impose prescribed actions based on the observed properties of traffic on a communications channel There is provided a No-Answer-Supervision Control Platform (NASCP) which prevents unscrupulous users of telephone services from avoiding billing through suppression of the answer supervision response. The NASCP actively detects when voice, facsimile or voice-band-data is seen to emerge from a side of a communications channel that is apparently on-hook based on the network signaling. Prescribed actions are promptly applied when such illegal activity is detected. The prescribed actions may include imposition of a recorded voice message, forced call termination, forced network signaling or other actions. The NASCP is preferred over alternative solutions because it is rapid in detection of illegal activity, it avoids the time and expense of upgrading switches in the network, and it only alters the normal functioning of the network when illegal usage is detected.

There is also provided a device to enable the offering of specialized telephone services which depend on the manner of customers' use. The apparatus actively determines whether the traffic on each side of a communications channel is voice, facsimile or voice-band-data, it determines which end the communications channel is generating the traffic, and it conditionally performs prescribed actions based on predefined rules on allowable traffic properties. The prescribed actions may include imposition of a recorded voice message, forced call termination, forced network signaling, application of specialized billing functions or other actions. The invention is preferred over alternative devices because it allows class-dependent actions to be imposed sooner in a call than was previously possible, it opens up new policing applications where the policing functions depend on which end of the call is generating the traffic, and it can be applied when only one side of the channel is off-hook.

BRIEF DESCRIPTION OF THE DRAWINGS

The novel features believed characteristic of the invention are set forth in the appended claims. The invention itself, however, as well as other features and advantages thereof, will be best understood by reference to the description which follows, read in conjunction with the accompanying drawings wherein:

FIG. 6 summarizes network-generated signals that may occur when only one side of a channel is off-hook.

DETAILED DESCRIPTION WITH REFERENCE TO THE DRAWINGS

Figure 1:
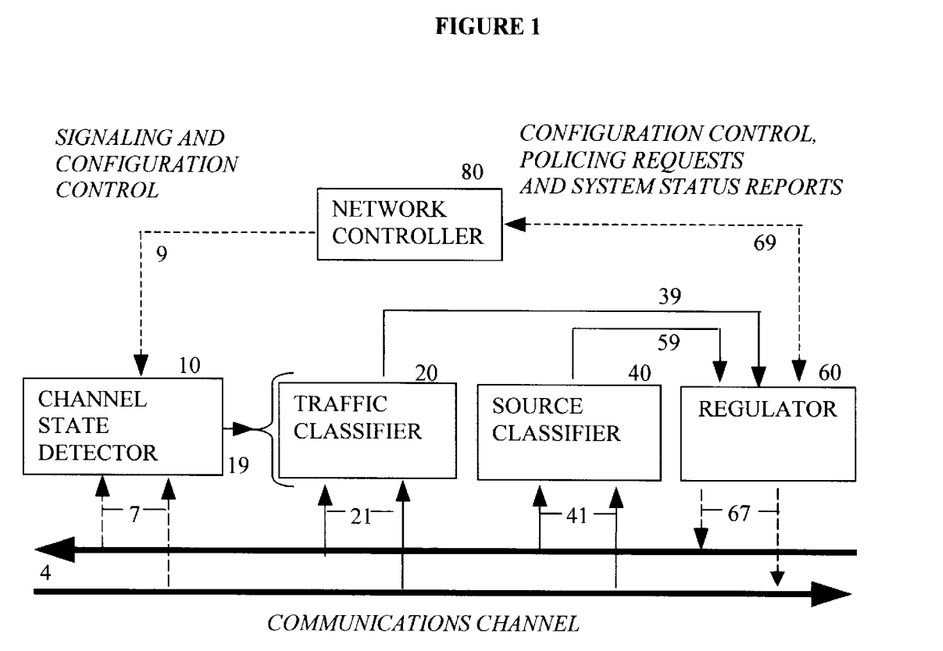
FIG. 1 is a general illustration of a representative embodiment of the invention.

Referring to FIG. 1 there is shown a block diagram of a representative embodiment of the invention. Briefly, the Channel State Detector 10 determines when to activate policing functions; the Traffic Classifier 20 determines an overall classification of the traffic, taking into account signal classifications derived from both sides of the Communications Channel 4; the Source Classifier 40 determines which side of the channel is generating the traffic; and the Regulator 60 implements prescribed actions based on information from the Traffic Classifier 20 and the Source Classifier 40. A Network Controller 80 is included to represent the interface with network control entities to provide a platform for general control, management and data collection functions. The Network Controller 80 may be omitted in some embodiments.

Channel State Detector 10

The Channel State Detector 10 detects when the Communications Channel 4 is in a state that warrants activation of policing functions. This usually amounts to enabling or disabling of policing functions depending on the hook-state of the channel. For example, policing functions for the NASCP are activated when only one side of the channel is off-hook, and policing functions for a facsimile-and-data-only service such as FaxCom are activated when both sides of the channel are off-hook. The hook-state of the channel may be determined from signaling information within the Communications Channel 4 (dashed lines 7), or from a separate signaling source (dotted line 9), depending on the signaling conventions used in the telephone network. In particular, dashed lines 7 are used for networks operated in accordance with what is commonly called Channel Associated Signaling (CAS) protocols, and dotted line 9 is used for networks operating in accordance with what is commonly called Common Channel Signaling (CCS) protocols. The output 19 of the Channel State Detector 10 is an enable/disable signal used for activating or deactivating policing functions in other parts of the invention.

Traffic Classifier 20

The Traffic Classifier 20 produces an output Traffic Class 39 which characterizes the traffic on the Communications Channel 4 at any given point in time. This is typically a two-stage process, where the first stage involves derivation of two signal classifications, one for each side of the communications channel, and the second stage involves generation of the output traffic class 39 based on the time course of the two signal classifications.

Figure 2:
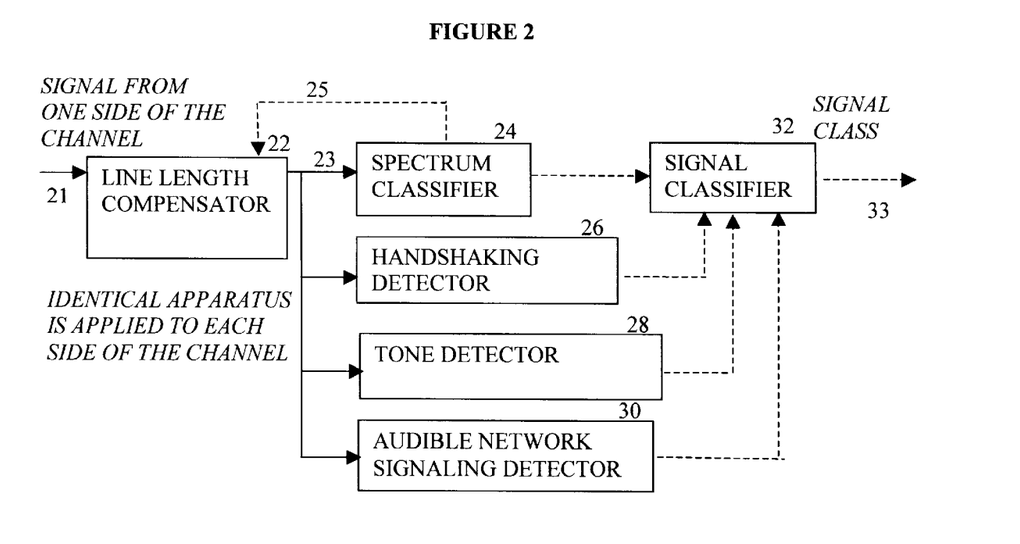
FIG. 2 illustrates an embodiment of the first stage in the Traffic Classifier of FIG. 1.

Referring to FIG. 2 there is a block diagram of an embodiment of the first stage of the Traffic Classifier 20. The input 21 is the signal from one side of the Communications Channel 4. The output Signal Class 33 is an indication of the type of signal on input 21. An identical apparatus is applied for each side of the channel. The Line Length Compensator 22 is a slowly-adapted filter used to compensate for the high-frequency attenuation caused by long communication lines. The compensated signal 23 is passed to the Spectrum Classifier 24 for estimating the most likely signal class based solely on the local spectral characteristics. The Spectrum Classifier 24 may also output spectral analysis information 25 for use in adaptation of the Line Length Compensator 22. The Handshaking Detector 26 and the Tone Detector 28 specifically detect a number of standard facsimile and VBD handshaking signals. The Audible Network Signaling Detector 30 specifically detects audible network signaling such as dial tone and busy signal. Finally, the Signal Classifier 32 determines the output Signal Class 33 based on information gathered from the time course of the outputs of the Spectrum Classifier 24 and the three detectors (26, 28, 30).

The set of signal classes output from FIG. 2 depends on the application. This set typically includes zero or more classes from each of the following general categories: Voice, Facsimile, VBD, Audible Network Signaling, Facsimile Handshaking, VBD Handshaking, Silence, and Unknown.

Figure 3:
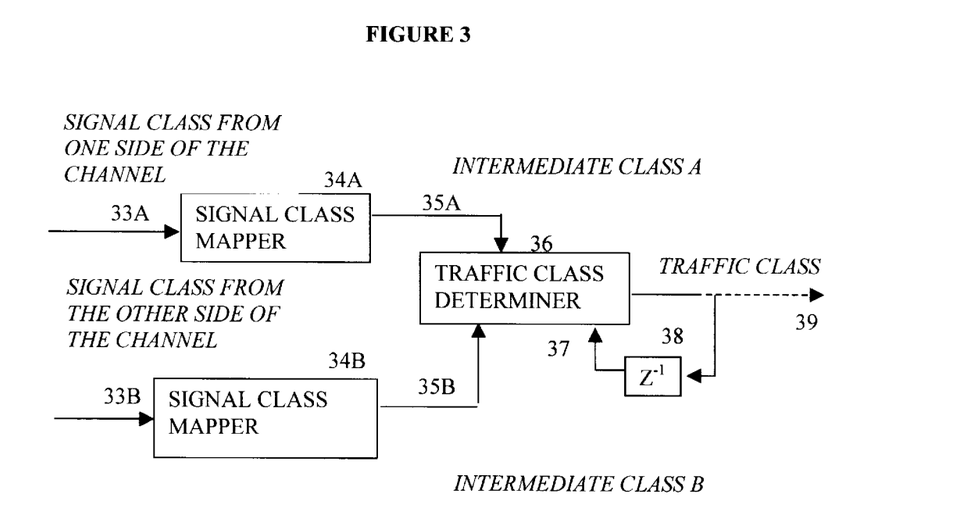
FIG. 3 illustrates an embodiment of the second stage in the Traffic Classifier of FIG. 1.

Referring to FIG. 3 there is a block diagram of an embodiment of the second stage of the Traffic Classifier 20. The inputs 33A and 33B are signal classifications, one from each side of the Communications Channel 4, such as are derived in the first stage of the Traffic Classifier 20. The input signal classifications are mapped onto a set of intermediate classes 35A and 35B, which are then used in combination with the current Traffic Class 37 to update the output Traffic Class 39.

The set of intermediate classes conveyed over lines 35A and 35B of FIG. 3, and the set of traffic classes output on line 39 of FIG. 3, depend on what is required in the Regulator 60 to meet the needs of the application. These sets typically includes zero or more classes from each of the following general categories: Voice, Facsimile, VBD, Audible Network Signaling, Facsimile Handshaking, VBD Handshaking, Silence, and Unknown.

In order to configure the Traffic Classifier 20 for a particular application, it is necessary to define tables for mapping of signal classes onto intermediate classes as well as a table for updating the output Traffic Class 39 based on the Intermediate Classes 35A and 35B and preceding values of the Traffic Class 37. Certain applications also require that the signal class mapping process be dynamically altered when certain signal classes are observed. This provides a mechanism for allowing handshaking early in the call to influence traffic classifications throughout the remainder of the call.

Source Classifier 40

The Source Classifier 40 produces an output source class 59 that indicates which end of the Communications Channel 4 is generating traffic at any given point in time. One can not assume that signals on a given side of a communications channel were generated on that side, as cross-talk and echoes can cause significant leakage from one side to another. Source classification is typically a two-stage process, where the first stage involves derivation of two amplitude estimates, one for each side of a communications channel, and the second stage involves generation of the output source class 59 based on the two amplitude estimates.

Figure 4:
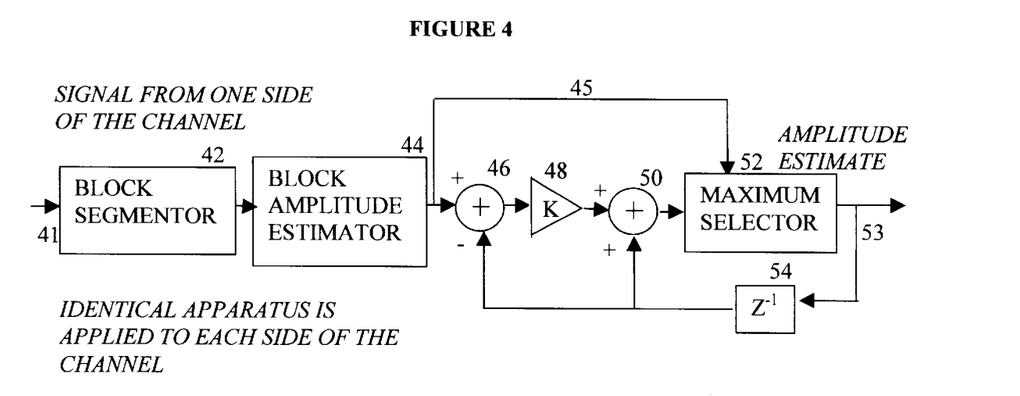
FIG. 4 illustrates an embodiment of the first stage in the Source Classifier of FIG. 1.

Referring to FIG. 4 there is a block diagram of an embodiment of the first stage of the Source Classifier 40. The input 41 is the signal from one side of the Communications Channel 4. The output Amplitude Estimate 53 is an estimate of the average amplitude on one side of the Communications Channel 4. An identical apparatus is applied for each side of the channel. The Block Segmenter 42 and the Block Amplitude Estimator 44 combine to periodically produce Block Amplitude Estimates 45, which are estimates of the average amplitude of the signal for successive blocks of signal samples. The average of the square of all samples in a block is a suitable formula for estimating a block's amplitude. The remaining components of FIG. 4 define a specialized averaging process which rapidly increases the output Amplitude Estimate 53 when it is less than the Block Amplitude 45, and slowly decreases the output Amplitude Estimate 53 when it is higher than the Block Amplitude 45. The Multiplier 48 determines the rate of decline of the output Amplitude Estimate 53 when the Block Amplitude 45 drops.

Figure 5:
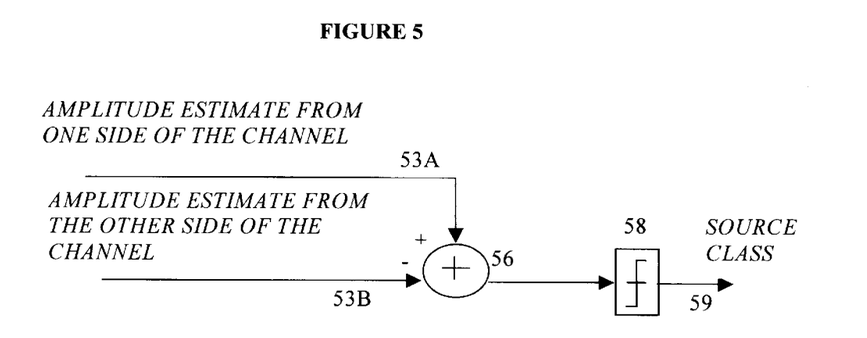
FIG. 5 illustrates an embodiment of the second stage in the Source Classifier of FIG. 1.

Referring to FIG. 5 there is a block diagram of an embodiment of the second stage of the Source Classifier 40. The inputs 53A and 53B are amplitude estimates, one from each side of the Communications Channel 4, such as are derived in the first stage of the Source Classifier 40. The output Source Class 59 indicates which side of the Communications Channel 4 is generating the traffic. The result is based on the notion that the signal originates from the side of the channel that has the largest estimated amplitude.

Regulator 60

The Regulator 60 causes conditional imposition of prescribed actions based on the Traffic Class 39 and the Source Class 59. It is configured to impose the prescribed actions when specified combinations of traffic classes and source classes occur, or when different specified combinations of traffic classes and source classes fail to occur within a specified period of time. These specified combinations may change over the course of policing as a consequence of the passage of time or the observance of specific combinations of traffic classes and source classes. The prescribed actions may comprise of altering the signal on the Communications Channel 4 (dashed lines 67), or sending of requests for prescribed actions to separate devices within the network (dotted line 69). The prescribed action may be to impose a recorded voice message, to terminate the call, to apply special billing functions, or other actions.

The Regulator 60 is typically implemented by mapping the Traffic Class 39 and Source Class 59 onto a set of generic categories such as "Good", "Maybe", "Bad" and "Silence", as well as two special categories called "Ignore" and "Freeze". Intervention does not occur when "Good" traffic is observed, but it is imposed when "Bad" traffic is observed. The "Maybe" category is equivalent to either "Good" or "Bad", depending on the configuration. The "Silence" category may or may not elicit intervention, depending on the requirements of the application.

The "Ignore" category and the "Freeze" category serve special functions in the Regulator 60. When a traffic class is mapped onto "Ignore", it has no effect on the actions of the Regulator 60. When a traffic class is mapped onto "Freeze", the Regulator 60 is disabled until a different traffic class is observed. In particular, actions that would normally occur when certain timers expire are deferred until the system is released from its frozen state.

Certain applications require refinements to the Regulator 60, such as inclusion of timers that are started (or stopped) when the Traffic Class 39 or Source Class 59 changes. This allows prescribed actions to be triggered when a given traffic class remains unaltered for a specified period of time. Other timers may be included for triggering of prescribed actions a specified period of time after the call starts. Other applications may require maintenance of running tallies of the time spent in each traffic class (and source class), or records of the sequence of observed traffic classes (and source classes).

It is generally desirable to provide mechanisms for partially disabling the Regulator 60. For example, the prescribed actions of the Regulator 60 can be disabled so that tests of policing functions can be performed without disturbing customers. The Regulator 60 is then operative for collection of data on the degree to which said prescribed actions would be imposed if they were active.

A preferred embodiment of the Regulator 60 operates as follows. An initial period of grace is allowed at the start of a call during which all traffic is acceptable, i.e., prescribed actions are never imposed during the grace period. After the grace period expires, the only acceptable class of traffic is facsimile, with all other traffic classes leading to imposition of a voice message and forced call termination. An alternative preferred emodiment operates to impose a voice message and terminate the call whenever voice is observed after the grace period. These preferred embodiments see application in policing of a "facsimile-only" telephone service and an "anything-but-voice" telephone service, respectively. Note that the grace period is an important element of the Regulator 60, because legitimate facsimile calls may be set up manually.

Network Controller 80

The Network Controller 80 represents the interface with control entities of the telephone network to provide control, management and data collection functions. Configuration control, reporting of alarms, detection of failures and execution of periodic system integrity checks are coordinated by the Network Controller 80. Periodic reports about the properties of traffic on the communications channel, and about the policing activities of the invention, are gathered by the Network Controller 80 and saved for future inspection. Such periodic reports are a direct outgrowth of the need for periodic system integrity checks, whereby the Network Controller 80 monitors the invention to ensure that policing functions are being applied appropriately. Finally, the Network Controller 80 may supply signaling information or implement policing actions when performance of such functions are not limited to operations performed on the Communications Channel 4.

AN EMBODIMENT FOR ANSWER SUPERVISION FRAUD CONTROL

The embodiment of the invention dedicated to control of answer supervision fraud is called the no-answer-supervision control platform (NASCP). Referring to the block diagram in FIG. 1, the various components of the NASCP perform the following functions:

1. The Channel State Detector 10 activates policing when only one side of a channel is off-hook, and deactivates policing at other times.
2. The Traffic Classifier 20 determines whether or not the channel is carrying signals generated by customers. The processing is consistent with FIG. 2 and FIG. 3, and descriptions thereof. Further details are provided in the sequel.
3. The Source Classifier 40 determines which side of the channel is generating the traffic. This is important in the NASCP because customer-generated traffic frequently appears on the off-hook side of a channel before a call is answered. For example, a person may talk to someone else while they are waiting for a call to be answered. The processing is consistent with FIG. 4 and FIG. 5, and descriptions thereof. The multiplier 48 in FIG. 4 is set such that the Amplitude Estimates 53 are averaged over a number of seconds. This ensures that the derived Source Class 59 does not change during relatively short silent periods such as are encountered in the "telephone ringing" signal, during silent periods in a voice conversation, or during page breaks within facsimile transmissions.
4. The Regulator 60 waits for a configurable "grace period" after being enabled by the Channel State Detector 10, and then acts to force both sides of the channel to an off-hook state when significant amounts of customer-generated traffic are observed emerging from the side of the channel that is apparently on-hook. The Regulator 60 also forces both sides of the channel to an off-hook state when the channel has been in a one-side-off-hook state for an inordinate period of time. The act of forcing both sides of the channel to an off-hook state causes switches in the network to initiate billing. For networks operated in accordance with what is commonly called channel associated signaling (CAS) protocols, the hook-state forcing functions are implemented by altering signaling information carried within the communications channel, i.e., dashed lines 67 in FIG. 1. For networks operating in accordance with what is commonly called Common Channel Signaling (CCS) protocols, the hook-state forcing functions are implemented by triggering the generation of signaling messages over a separate signaling network, i.e., dotted line 69 in FIG. 1. Other functions, such as imposition of a voice message or call termination, can also be performed by the Regulator 60 if needed by the network service provider.

Referring to FIG. 6 there is an overview of network-generated signals that can occur at various points in a telephone network when only one side of a channel is off-hook. The Traffic Classifier 20 in the NASCP needs to specifically detect only a subset of these signals, as some of them only appear at certain points in the network, while others only appear under circumstances that arise when both sides are off-hook. The following comments apply:

1. SS4 and SS5 Signaling Tones: In older network equipment, many call administration functions are performed by passing high-frequency tone pulses. Single-component and double-component tone pulses with component frequencies of 2040 Hz, 2400 Hz and/or 2600 Hz are used. These signals do not appear where a NASCP is logically located in today's networks.
2. Low Frequency Audible Signaling Tones: A wide variety of audible signaling tones are defined to provide customers with feedback on the status of their call. Standards suggest a "precise tone plan" for such signals, where all signaling tones are defined as one-component or two-component signals whose component frequencies are 350 Hz, 440 Hz, 480 Hz or 620 Hz. While the precise tone plan is not universally adhered to, it is fair to say that Low Frequency Audible Signaling tones are comprised of either one or two sinusoidal components, each with a frequency lower than about 620 Hz. A number of these tones, such as the Dial Tone, the Ringing Tone or the Busy Tone, are common for relatively long periods of time during a one-side-off-hook condition. Hence, the NASCP must separately classify such signals.
3. Recording Warning Tone (RWT): The RWT is used to inform customers that a conversation is being recorded. The NASCP does not need to detect RWT because, if a conversation is in progress, the call will have advanced to a state where both sides are off-hook.
4. Payphone Recognition Tone (PRT): The PRT is used to identify a called phone as a payphone so that operators can prevent fraud on collect calls. The PRT is normally generated immediately after the called party answers the call and as such is not a concern for the NASCP. The PRT can also be used to identify when a caller is a payphone, in which case it may appear during the one-side off-hook interval. However, many administrations do not use the PRT in this manner, and when it is used it will appear to emerge from an off-hook source from the point of view of the NASCP. Therefore, the NASCP does not need to actively detect the PRT.
5. Coin Deposit Tone (CDT): The CDT is a combination of 1700 Hz and 2200 Hz at (nominally) the same amplitude. Separate classification of CDT by the NASCP is not necessary, as people do not need to deposit coins when calling 1-800 numbers, which is the main area where answer supervision fraud occurs.
6. Special Information Tone (SIT): The SIT is used to inform a caller of unusual reasons for call failure. The SIT is usually followed by a short recorded voice message. The NASCP must accept SIT, and voice messages after SIT, as being valid network-generated signals. This allows for network-generated voice messages to be inserted in accordance with common practice.

7. Receiver Off-Hook (ROH) Howler Signal: ROH is generated when one of the participants in a call fails to hang up. Since in this circumstance the call has already been completed, the NASCP need not separately classify the ROH signal. ROH can also be generated when a customer lifts up the handset but fails to dial. In this case the "call" is unlikely to ever pass through the NASCP. The conclusion is that the NASCP does not need to take special measures to detect the ROH signal.

8. Multi-Frequency Signaling (MF): When channel associated signalling is employed, MF tones are used within the network for communicating called numbers and calling numbers. Such tones occur in a relatively short burst near the start of a call. The NASCP can thus ignore MF by simply delaying the activation of policing by a few seconds.

9. Dual Tone Multi-Frequency (DTMF) for Dialing: DTMF does not normally occur for call setup within the network. However, such signals may occur if the NASCP is located between the PBX and the network. Like MF, one can assume that network-generated DTMF occurs in a short burst near the start of the call.

10. Other DTMF: DTMF generated by the customer after the number is dialed should be lumped with Voice and VBD as illegal activity when only one side is off hook. That is, the NASCP should treat such DTMF as if it were Voice or VBD.

By the discussion presented here, the Traffic Classifier 20 in the NASCP needs to actively detect the low-frequency audible signaling tones, the special information tone, and a short voice message after the special information tone. Other network signals may also need to be detected, depending on the practices of the telecommunications service provider.

By interpreting voice after SIT as a network-generated signal, a means has in principle been created for defeating the NASCP by repeated insertion of SIT into the call. However, such action would require complicity of both parties in accepting periodic insertion of SIT. Callers of 1-800 numbers are not likely to find this acceptable. Owners of 1-800 numbers will also not be eager to explain to customers that they are inserting the SIT for the purpose of fraud. Nonetheless, network administrators may prefer to disable this feature of the NASCP, or to introduce additional constraints on the allowable frequency and duration of SIT messages passing through the NASCP.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of embodiments as fall within the true scope of the invention.

I claim:

1. An apparatus for performing policing functions for telephone services in a telephone network, wherein prescribed actions are conditionally imposed based on the properties of traffic on a communications channel, comprising:

(a) a channel state detector coupled to said communications channel and operative to enable and disable the policing functions;

(b) a traffic classifier coupled to said communications channel operative to classify traffic on said communications channel into a traffic class;

(c) a source classifier coupled to said communications channel operative to determine which end of the communications channel is the dominant source of traffic; and (d) a regulator device coupled to said traffic and source classifiers and to said communications channel and operative to initiate conditional imposition of prescribed actions if the policing functions are enabled, the conditional imposition being based on the traffic class and the determination of the source classifier.

2. An apparatus according to claim 1 wherein said communications channel is a ubiquitous channel for carrying voice, facsimile or voice-band-data traffic.

3. An apparatus according to claim 1, wherein said channel state detector includes an enabling and disabling device operative to enable and disable the policing functions based on an apparent on-hook and off-hook state of each end of said communications channel, the apparent on-hook and off-hook state being determined by signals received from the telephone network.

4. An apparatus according to claim 1 wherein said traffic classifier comprises a first stage which classifies a signal on each side of said communications channel to provide derived signal classifications, and a second stage having respective inputs thereto coupled to outputs from said first stage and providing an output traffic class based on the derived signal classifications for each side of said communications channel.

5. An apparatus according to claim 4 wherein said first stage has two identical signal classification devices, one coupled to each side of said communications channel, each of said signal classification devices comprising:

(a) a line length compensator coupled to a corresponding side of said communications channel and operative to derive a compensated signal which compensates for high-frequency attenuation caused by the effects of long telephone lines;

(b) a spectrum classifier coupled to said line length compensator operative to analyze the spectral characteristics and determine the likely signal classification of the compensated signal;

(c) a handshaking detector and a tone detector each coupled to said line length compensator operative to detect tones and handshaking signals of telephone network traffic; and (d) a signal classifier coupled to said spectrum classifier, said handshaking detector and said tone detector and operative to derive an output signal class.

6. An apparatus according to claim 5, including an audible signaling detector having an input coupled to an output of said line length compensator and an output coupled to said signaling classifier, said audible signaling detector operative to supply said signal classifier with indications of the presence of audible network signaling on the compensated signal, where the indications are considered in the signal classifier in deriving the output signal class.

7. An apparatus according to claim 5 wherein said second stage is comprised of:

(a) a pair of signal class mappers coupled to respective outputs of said signal classification devices and operative to derive a pair of intermediate classifications; and (b) a traffic class determiner coupled to an output of each of said signal class mappers and operative to determine an output traffic class based on the intermediate classifications and prior samples of the output traffic class.

8. An apparatus according to claim 7 wherein said signal class mappers are modified in response to the presence of predetermined signal classes.

9. An apparatus according to claim 4 wherein said derived signal classifications and said output traffic class each include classes selected from a group consisting of Voice, Facsimile, Voice-Band-Data, Audible Network Signaling, Facsimile Handshaking, Voice-Band-Data Handshaking, Silence and Unknown.

10. An apparatus according to claim 1 wherein said source classifier comprises a first stage which derives an amplitude estimate for each side of said communications channel, and a second stage having respective inputs thereto coupled to outputs from said first stage and providing an output source class based upon the derived amplitude estimates for each side of said communications channel.

11. An apparatus according to claim 10 wherein said first stage is comprised of two identical amplitude estimation devices coupled to respective sides of said communications channel, each amplitude estimation device comprising:

(a) a block segmenter coupled to one side of said communications channel operative to isolate blocks of signal samples;

(b) a block amplitude estimator coupled to an output of said block segmenter operative to produce periodic estimates of the amplitude of the signal for successive blocks of signal samples; and (c) an averager coupled to an output of said block amplitude estimator operative to produce an output amplitude estimate for signals on said one side of said communications channel.

12. An apparatus according to claim 11 wherein said block amplitude estimator is based on the average of the square of signal samples within a block.

13. An apparatus according to claim 11 wherein said averager acts to rapidly increase the output amplitude estimate when its current value is lower than the output of the block amplitude estimator, and to slowly decrease the output amplitude estimate when its current value is higher than the output of the block amplitude estimator.

14. An apparatus according to claim 10 wherein said second stage produces an output source class based on identification of the largest of the two amplitude estimates output from said first stage.

15. An apparatus according to claim 1 wherein said regulator device imposes prescribed actions on said communications channel when specified combinations of traffic classes and source classes occur, and when different specified combinations of traffic classes and source classes fail to occur within a specified period of time.

16. An apparatus according to claim 15 wherein said specified combinations are modified during the course of policing on said communications channel, said modification being a consequence of the passage of time and the observance of specific combinations of traffic classes and source classes.

17. An apparatus according to claim 15 wherein the prescribed actions of said regulator device include imposition of a voice message on said communications channel.

18. An apparatus according to claim 15 wherein said prescribed actions include forcing of both sides of said communications channel to an on-hook state, thereby causing calls and call setup attempts to be terminated by switches in the telephone network.

19. An apparatus according to claim 15 wherein said prescribed actions include forcing of both sides of said communications channel to an off-hook state, thereby ensuring that switches within the telephone network receive an answer supervision response.

20. An apparatus according to claim 1 wherein said channel state detector and said regulator device are each couplable with controlling devices of the telephone network to obtain control, management and data collection functions.

21. An apparatus according to claim 20 wherein said controlling devices coordinate system configuration, reporting of alarms, detection of system failures, execution of periodic system integrity checks, and the gathering and storage of reports on the policing functions.

22. An apparatus according to claim 20 wherein said controlling devices supply signaling information to said channel state detector when such signaling information is not available from said communications channel.

23. An apparatus according to claim 20 wherein said controlling devices coordinate the performance of said prescribed actions when such actions are not limited to manipulation of the signal on said communications channel.

24. An apparatus according to claim 1 wherein said policing functions comprise voice message imposition and call termination when:

(a) network signaling indicates that both sides of said communications channel are in an off-hook state;

(b) a specified period of grace has elapsed since the both sides of the channel went off-rook; and (c) the properties of traffic observed on the channel are not consistent with the predetermined set of traffic properties that the network service provider wishes to allow on said communications channel.

25. An apparatus according to claim 1 wherein said policing functions comprise forcing of both sides of the communications channel to an off-hook state when:

(a) network signaling indicates that only one side or said communications channel is in an off-hook state;

(b) a specified period of grace has elapsed since entering a state where only one side of the channel is off-hook;

(c) the source class indicates that the traffic is emerging from the side of the channel that is apparently on-hook; and (d) the traffic class for the side of the channel that is apparently on-hook is not consistent with traffic generated by the network service provider.

26. An apparatus according to claim 1 wherein said policing functions include unconditional imposition of prescribed actions a specified period of time after the onset of policing.

27. An apparatus according to claim 1 wherein said prescribed actions are disabled, thereby making it operative for collection of data on the degree to which said prescribed actions would be imposed if they were activated.

28. A method for performing policing functions for telephone services in a telephone network having network controlling devices and a communications channel so as to conditionally impose prescribed actions on the communications channel based upon the properties of traffic thereon, comprising the steps of:

(a) determining whether said communications channel is in a state that warrants activation of said policing functions;

(b) classifying the traffic into a traffic class;

(c) determining which end of the communications channel is the dominant source of traffic; and (d) initiating conditional imposition of prescribed actions if the policing functions are enabled, the conditional imposition being based upon the traffic class and the determination in step (c).

29. A method according to claim 28, including enabling and disabling of the policing functions in response to signals corresponding to apparent on-hook and off-hook states of each end of said communications channel.

30. A method according to claim 28, including classifying a signal on each side of said communications channel to provide derived signal classifications and generating an output traffic class based upon the derived signal classifications.

31. A method according to claim 28, wherein said classifying step (b) includes:

(b1) deriving a compensated signal which compensates for the effects of long telephone lines;

(b2) analyzing the spectral characteristics and determining the likely signal classification of the compensated signal;

(b3) detecting tones and handshaking signals of telephone network traffic; and (b4) deriving an output signal class based on the results of steps (b1), (b2), and (b3).

32. A method according to claim 28, wherein said communications channel is an ubiquitous channel for carrying voice, facsimile or voice-band-data traffic.

* * * * *